United States Patent [19]

Tysver et al.

[11] Patent Number: 4,967,886
[45] Date of Patent: Nov. 6, 1990

[54] DUAL FUNCTION BRAKE AND MANUAL DRIVE ACTUATING SYSTEM

[75] Inventors: John D. Tysver; Thomas A. Gendron; William E. Seidel, all of Rockford, Ill.

[73] Assignee: Sundstrand Corporation, Rockford, Ill.

[21] Appl. No.: 390,490

[22] Filed: Aug. 1, 1989

Related U.S. Application Data

[63] Continuation of Ser. No. 117,832, Nov. 9, 1987, abandoned.

[51] Int. Cl.[5] .............................................. F16D 67/02
[52] U.S. Cl. ...................................... 192/18 A; 92/63; 92/130 A; 188/170; 192/89 A; 192/91 A
[58] Field of Search ..................... 188/170, 106 F, 166; 92/130 A, 63; 192/89 A, 91 R, 91 A, 83, 18 A, 19; 303/9.76

[56] References Cited

U.S. PATENT DOCUMENTS

| 1,254,372 | 1/1918 | Stanley. | |
|---|---|---|---|
| 2,659,466 | 11/1953 | Ochtman | 192/8 R |
| 3,082,647 | 3/1963 | Banker | 188/170 X |
| 3,203,523 | 8/1965 | Gilder et al. | |
| 3,680,672 | 8/1972 | McCurley | 192/8 R |
| 3,863,038 | 1/1975 | Kreitner et al. | 188/170 |
| 3,893,556 | 7/1975 | Lech, Jr. et al. | |
| 3,927,737 | 12/1975 | Prillinger et al. | |
| 4,118,013 | 10/1978 | Christison et al. | 192/8 R X |
| 4,176,733 | 12/1979 | Twickler | 192/8 R X |
| 4,245,724 | 1/1981 | Beck | 188/170 |
| 4,632,639 | 12/1986 | Beaumont. | |

FOREIGN PATENT DOCUMENTS

| 1346621 | 11/1963 | France | 188/170 |
|---|---|---|---|
| 119545 | 9/1980 | Japan | 188/166 |

*Primary Examiner*—George E. A. Halvosa
*Attorney, Agent, or Firm*—Wood, Phillips, Mason, Rectenwald & Vansanten

[57] ABSTRACT

A dual function brake and manual drive actuating system for selectively holding a rotatable member of a drive train and manually driving the drive train. A support structure is provided, with a brake operatively associated between the support structure and the rotatable member for holding the member against rotation. A common release member is operatively associated with the brake. A fluid retracting mechanism operates against the common release member to selectively hold the brake in disengaged condition. A manual retracting mechanism also operates against the common release member to selectively hold the brake in disengaged condition. A manual drive is incorporated in the manual retracting mechanism for manually rotating the rotatable member when in the disengaged condtion.

11 Claims, 1 Drawing Sheet

DUAL FUNCTION BRAKE AND MANUAL DRIVE ACTUATING SYSTEM

This application is a continuation of application Ser. No. 117,832, filed Nov. 9, 1987.

FIELD OF THE INVENTION

This invention generally relates to brake actuating systems and, particularly, to a dual function hydraulic and manual system which incorporates a manual drive.

BACKGROUND OF THE INVENTION

In aerospace applications, such apparatus as doors, missile launcher rotating devices and other mechanisms are held in engaged or locked condition by brake mechanisms which act against rotation of a rotatable drive member in the drive train for operating the apparatus. The brakes are disengaged to allow the related apparatus, such as a door or missile launcher rotating device, to be moved by the rotatable member. Conventionally, two separate brake assemblies are employed One brake assembly supplies system positional braking during operation and usually is hydraulically operated and released to hold the brake in disengaged condition. When on the ground or under other non-operational conditions, the hydraulic system normally is not activated. A second, manual brake assembly, independent of the hydraulic brake assembly, conventionally is employed for non-operational conditions. Alternatively, auxiliary or portable hydraulic brake units may be employed.

The second or manual brakes often are add-on units with no common components to the hydraulic system brake unit. Two separate assemblies, including brake plate sets, biasing springs, rotors and other components comprise the individual, differently operated brake units. Two braking systems create inefficient packaging, and an exhorbitant number of parts, increased costs and increased weight. These parameters are critical in aerospace applications.

In addition, it would be desirable for the manual brake to have the added function of performing a manual drive. However, such manual brake units must be able to counteract opposing and aiding loads on the output drive to prevent "run away". In other words, should the manual brake be used to attempt to hold the brake in disengaged condition, aiding or opposing loads such as a heavy door may be encountered, versus a manual force. The manual brake should be capable of effecting a controlled drive function allowing smooth operation and no run-away condition.

This invention is directed to providing a unitary, dual function brake and manual drive actuating system incorporating a hydraulic and a manual brake retracting means in a singular unit.

SUMMARY OF THE INVENTION

An object, therefore, of the invention is to provide a dual function brake and manual drive actuating system for selectively holding a rotatable member of a drive train and manually driving the drive train.

In the exemplary embodiment of the invention, a support structure is provided, with brake means operatively associated between the support structure and the rotatable member for holding the member against rotation. Fluid retracting means, including a release member, are provided for selectively holding the brake means in disengaged condition. Manual retracting means are operatively associated with the release member of the fluid retracting means for selectively moving the brake means to the disengaged condition. Manual drive means are operatively associated with the manual retracting means for manually rotating the rotatable member when in the disengaged condition.

In essence, a fluid retracting means and a manual retracting means are operatively associated with a common release member operatively associated with the brake means. As disclosed herein, the fluid retracting means, the release member and the manual retracting means all are mounted within the support structure for movement axially of the rotatable member. The fluid retracting means are mounted within the support structure at one axial end of the brake means, and the manual retracting means are mounted within the support structure at an opposite axial end of the brake means. The manual retracting means include a link member extending axially past the brake means for engaging the common release member which, as disclosed herein, is sandwiched between the brake means and spring engagement means which biases the brake means to engaged condition.

The manual drive means include a ball and ramp device which has ramp means for effecting movement of the brake means to disengaged condition and stop limit means for effecting manual rotation of the rotatable member.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
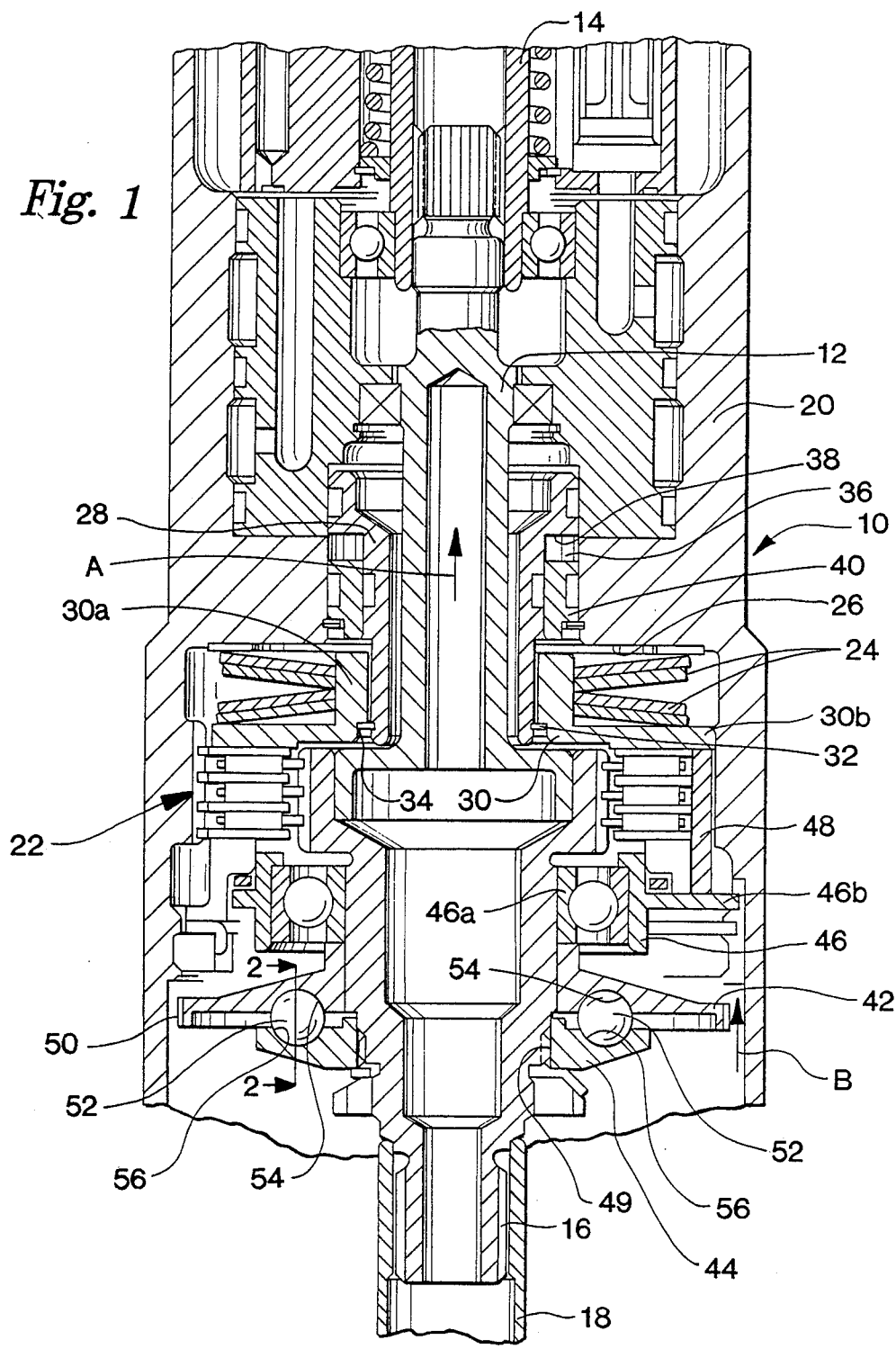
FIG. 1 is an axial section taken through the dual function brake and manual drive actuating system of the invention.

Referring to the drawings in greater detail, and first to FIG. 1, the invention is incorporated herein in a dual function brake and manual drive actuating system, generally designated 10, for selectively holding a rotatable member 12 of an appropriate drive train and manually driving the drive train. Rotatable member 12 may extend from a motor block 14 at one end and splined, as at 16, to an output shaft 18 which would drive a given component of an operational system, such as a door, a missile launcher rotating apparatus or other operational mechanism. The system is mounted within a support structure 20 which, in essence, comprises a housing of a cylindrical or other appropriate shape extending axially about rotatable member 12.

Brake means, generally designated 22, are operatively associated between support structure 20 and rotatable member 12 for holding the member against rotation. The brake means comprise conventional interleaved brake plates alternatively anchored to the support structure and the rotatable member, sometimes being termed as brake "rotors" and "stators". Biasing means, such as BELLEVILLE washer-type springs 24, abut against an interior shoulder 26 of support structure 20 for biasing brake means 22 to engaged condition.

Fluid retracting means are provided for selectively holding brake means in disengaged condition. More particularly, a hydraulic release piston 28 is mounted within support structure 20, surrounding rotatable member 12. A release member 30 has a generally cylindrical hub portion 30a surrounding the lower end of hydraulic release piston 28 and a radially projecting flange portion 30b sandwiched between BELLEVILLE washer-type springs 24 and brake means 22. A snap ring 32 in locking engagement with release piston 28 engages under a shoulder 34 of release member 30 such that upward movement of release piston 28 in the direction of arrow "A" causes release member 30 to move upwardly therewith. Hydraulic pressure is appropriately admitted to support structure 20, to a brake release port 36 on the underside of a shoulder 38 of release piston 28. Seals 40 are provided on opposite sides of hydraulic release port 36 whereby the port is completely surrounded by the support structure, the release piston and the seals.

In normal operation of the fluid retracting means described above, hydraulic pressure is admitted to brake release port 36 whereupon release piston 28 is driven upwardly in the direction of arrow "A". The release piston 28 pulls release member 30 upwardly therewith, through snap ring 32, against the biasing of BELLEVILLE washer-type springs 24. Upon compression of the springs, the brake plates of brake means 22 are released which, in turn, releases the braking action of the brake on rotatable member 12, thereby retracting the holding effect on the rotatable member.

Manual retracting means also are provided within support structure 20 on the opposite end or side of brake means 22 for selectively moving the brake means to its disengaged condition. In essence, the manual retracting means operates directly on release member 30 which thereby comprises a common release member for both the fluid retracting means and the manual retracting means. More particularly, the manual retracting means include a rotatable input ramp plate 42, a stationary output ramp plate 44, a manual release piston 46 and a brake release pin 48. Ramp plate 44 is fixed, as at spline 49, to rotatable member 12.

Generally, it can be seen that upward movement of input ramp plate 42 in the direction of arrow "B" will cause the input ramp plate to engage a bearing portion 46a of manual release piston 46. The manual release piston has a radially outwardly directed flange portion 46b which engages the underside of brake release pin 48. The top of the brake release pin engages the underside of release member 30. Therefore, the release member will compress BELLEVILLE washer-type springs 24 as described above, retracting the biasing pressure on the brake plates of brake means 22, and effecting retraction of the braking forces on rotatable member 12. Input ramp plate 42 can be manually rotated in any of a variety of manners. To this end only, the ramp plate is shown with a gear tooth array 50 about the outer periphery thereof. In this manner, a mating gear (not shown) may be provided to rotate the ramp plate either by a manual crank or a power assisted device such as an electrical motor.

Figure 2:
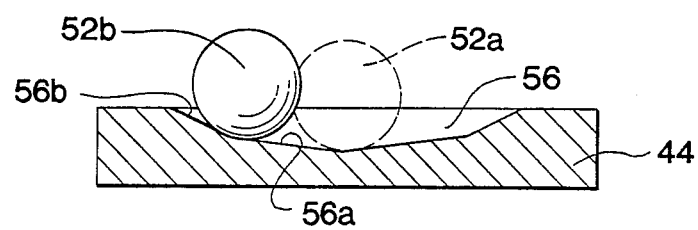
FIG. 2 is an enlarged section through a portion of the ball and ramp device incorporated with the invention.

A ball and ramp device is provided between input ramp plate 42 and output ramp plate 44. Referring to FIG. 2 in conjunction with FIG. 1, balls 52 are received in semi-spherical sockets 54 on the underside of input ramp plate 42. The balls are receivable or engageable within ramp grooves or slots 56 formed in the top side of output ramp plate 44. As best seen in FIG. 2, slots 56 are arcuately elongated to define cam ramps which have a first ramp portion 56a and a more critically angled or inclined ramp portion 56b. Ball 52a is shown in phantom seated at the bottom of the slot as in the condition of full braking or engaged condition. Ball 52b is shown in phantom at the juncture of ramp portions 56a and 56b to indicate a position of brake disengagement whereby input ramp plate 42 (FIG. 1) has been biased by the ball upwardly in the direction of arrow "B" to retract the biasing of BELLEVILLE washer-type springs 24 to release the brake. More critically inclined ramp portion 56 defines a controlled stop limit which establishes an equilibrium condition for proper brake plate separation with an "opposing load". Input ramp plate 42 is used to manually drive rotatable member 12 (e.g. through gears 50), with an "aiding load", the ramp plates will reduce the spring load on the brakes to a necessary level for the rotary brake plates to drag at a controlled rate allowing smooth operation and no runaway condition.

From the foregoing, it can be seen that not only has a dual function, i.e. both hydraulic and manual, brake actuating system been provided in a unitary or singular unit, but controlled manual driving is afforded to manually drive the rotatable member of the drive train.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A dual function brake and manual drive actuating system for selectively holding a rotatable member of a drive train and manually driving the drive train, said system comprising:

a support structure;

brake means operatively associated between said support structure and the rotatable member for holding the member against rotation;

a common release member mounted within the support structure for movement axially of the rotatable member free from rotation of the rotatable member and operatively associated with the brake means;

fluid retracting means mounted within the support structure and surrounding the rotatable member for operating against said common release member to selectively hold the brake means in disengaged condition, manual retracting means mounted within the support structure for operating against said common release member to selectively hold the brake means in said disengaged condition, said manual retracting means having at least a portion that is movable independently and free from rotation of said rotatable member;

means on said manual retracting means internally of said support structure for facilitating manual movement of the portion of said manual retracting means independently and free from rotation of said rotatable member and relatively free from drag to thereby effect movement of said brake means to said disengaged condition; and selectively operable manual drive means operatively associated with the manual retracting means for manually rotating a rotatable member with the brake means in said disengaged condition.

2. The system of claim 1 wherein said fluid retracting means, release member and manual retracting means all are mounted within the support structure for movement axially of the rotatable member.

3. The system of claim 2 wherein said fluid retracting means are mounted within the support structure at one axial end of the brake means, and the manual retracting means are mounted within the support structure at an opposite end of the brake means.

4. The system of claim 3 wherein said manual retracting means include a link member extending axially past the brake means for engaging the release member of the fluid retracting means.

5. The system of claim 1 including spring engagement means for biasing the brake means to engaged condition, said common release member being sandwiched between the spring engagement means and the brake means.

6. The system of claim 5 wherein said fluid retracting means are mounted within the support structure at one axial end of the brake means, and the manual retracting means are mounted within the support structure at an opposite end of the brake means.

7. The system of claim 6 wherein said common release member is mounted within the support structure at said one end of the brake means, and said manual retracting means include a link member extending axially past the brake means for engaging the release member.

8. The system of claim 1 wherein said manual drive means include a ball and ramp device.

9. The system of claim 8 wherein said ball and ramp device include ramp means for effecting said movement of the brake means to said disengaged condition and stop limit means for effecting said manual rotation of the rotatable member.

10. A dual function brake and manual drive actuating system for selectively holding a rotatable member of a drive train and manually driving the drive train, said system comprising:

a support structure;

brake means operatively associated between said support structure and the rotatable member for holding the member against rotation;

a common release member mounted within the support structure for movement axially of the rotatable member free from rotation of the rotatable member and operatively associated with the brake means;

fluid retracting means mounted within the support structure and surrounding the rotatable member for operating against the common release member to selectively hold the brake means in said disengaged condition;

manual retracting means mounted within the support structure for operating against said common release member to selectively hold the brake means in said disengaged condition, said manual retracting means having at least a portion that is movable independently and free from rotation of said rotatable member;

means on said manual retracting means for facilitating manual movement of the portion of said manual retracting means independently and free from rotation of said rotatable member and relatively free from drag to thereby effect movement of said brake means to said disengaged condition, one of said fluid retracting means and manual retracting means being mounted at said one axial end of the brake means and the other being mounted at an opposite axial end of the brake means and including a link member extending axially past the brake means for engaging the common release member; and manual drive means operatively associated with the manual retracting means for manually rotating the rotatable member with the brake means in said disengaged condition.

11. The system of claim 10 wherein said manual drive means include a ball and ramp device having ramp means for effecting said movement of the brake means to said disengaged condition and stop limit means for effecting said manual rotation of the rotatable member.

* * * * *